Sept. 7, 1926.
W. J. BELL
1,599,200
SHADE FOR MOTOR VEHICLES
Filed Oct. 10, 1921
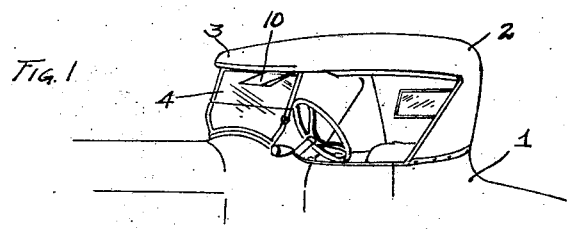
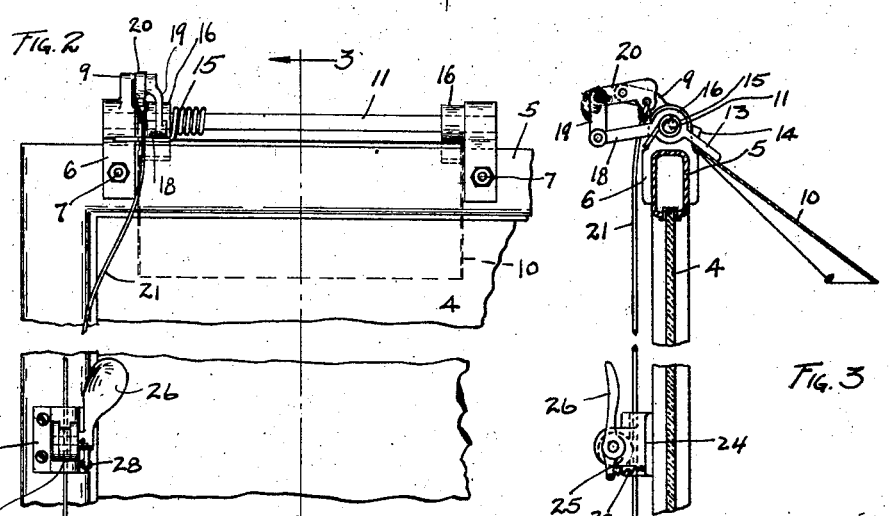
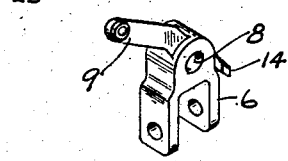
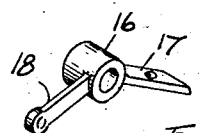
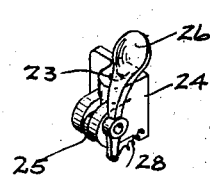
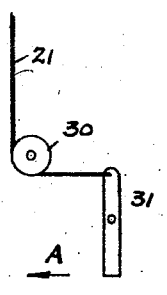
INVENTOR.
Willard J. Bell
BY Fay, Oberlin & Fay
ATTORNEYS Patented Sept. 7, 1926.

1,599,200

UNITED STATES PATENT OFFICE.

WILLARD J. BELL, OF NEWAYGO, MICHIGAN.

SHADE FOR MOTOR VEHICLES.

Application filed October 10, 1921. Serial No. 506,868.

The present invention relates to a shade for motor vehicles intended to supplement the top and windshield which are commonly used in motor driven vehicles and which meet in front and above the front compartment in which the driver sits. The present shade is intended not only to protect the driver against the sun when the latter is low in the sky, but also against the glare of headlights of oncoming vehicles which have been the cause of so many serious accidents in the operation of motor vehicles on narrow country roads, as well as to protect the windshield from rain and snow. A further object of the invention is the provision of such a shade which may be preliminarily adjusted for ordinary operating conditions and which can, nevertheless, be moved quickly and conveniently by the operator of the vehicle to shut out the light from the headlights of an oncoming vehicle while permitting the operator to himself see the road ahead. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principal of the invention may be used.

In said annexed drawing:—

Fig. 1 is a view in perspective showing a part of an automobile provided with a top and windshield to which my improved shade is attached;

Fig. 2 is a view from the interior of the vehicle looking forward through the windshield and showing the mounting of my improved shade;

Fig. 3 is a section on the line 3—3 in Fig. 2;

Fig. 4 is a view in perspective of the locking device illustrated in Fig. 2, which will be described more fully hereinafter;

Fig. 5 and Fig. 6 are detailed perspective views of an attaching bracket and a bell crank, respectively, used in the embodiment of my invention illustrated in Figs. 1 to 7.

Fig. 7 is a view of a modified form of operating means.

In Fig. 1 there is shown an automobile 1 to the body of which is attached a top 2 extending forwardly to front end 3 of the top extending slightly beyond a windshield 4. My improved shade is attached either to the top or to the upper bar 5 of the windshield frame, as may be most convenient, and is here shown for illustration only as mounted upon the top bar 5 of the windshield frame.

In Figs. 2 and 3 there is shown the windshield 4, the glass of which is set in the tubular frame members 5. Bolted to the upper tubular frame member 5 are two brackets 6 which are provided with spaces, parallel arms or lug portions extending down on either side of the frame where they are secured thereto by bolt 7, these bracket members being provided with lined openings 8 and rearwardly extending supports 9. The shade 10 is a sheet of metal or other material which is provided with a nonreflecting lower surface which may be conveniently secured by painting this side of the shield with a dead black paint the shade being provided with a bar or rod 11 extending across its upper edge which is pivotally mounted in the openings 8 in the bracket 6.

The shaft 11 is provided with a flange 13 to which is secured the shade 10 and this flange 13 is designed to contact with stops 14 formed on the bracket 6 to determine the uppermost position of the shade. This limiting position of the shade is so designed as to bring the lower edge of the shade at such a level that the operator may conveniently see under it while preventing the rays of the sun even when very low in the sky from reaching the eyes of the driver. The shade is maintained in this position by means of a coil spring 15 maintained about the shaft 11, one end of which is passed through an opening in the shaft 11, as shown in Fig. 3, while the other end is secured in a similar opening in the side of the bracket 6 and this spring is mounted about the shaft and in the bracket under an initial tension.

Mounted on the shaft 11 is the bell crank 16, which is shown in Fig. 6. The forward arm 17 of this bell crank lever forms the flange 13 to which is secured the shade 10, while the rear arm 18 of the lever is connected to a lug 19 which is in turn connected to a second lug 20, the latter being pivotally mounted upon a bolt received in the end of the supporting arm 9 of the bracket 6. To the free end of the lug 20 is attached a cord or rod 21 which passes down inside of the windshield and into the driver's compartment and carries at its end a handle 22. This cord or rod 21 passes through an opening 23 in a bracket 24 which may conveniently be attached either to the side of the driver's compartment of the car or to the lower portion of the interior of the windshield. Mounted in the bracket 24 is a cam 25 which is operated by a handle 26 and which when the handle is pulled down, is pressed into the opening in the bracket through which passes the cord 21. By pulling down the handle 26 the cord 21 may be locked against further movement through the bracket by being wedged against the wall of the opening by means of this cam surface 25. A spring 28 connected to the lower end of the handle 26 serves to keep a very slight pressure against the cord 21.

The operator of the vehicle, when approaching another vehicle with very bright headlights, may desire to lower the sun shade to a position to cut out these headlights while at the same time permitting him to see under the shade in order to watch the road. To accomplish this he pulls on the handle 22 which lowers the shade 4, and when the latter has reached the desired position the driver pulls down the handle 26, locking the shade in that position. As soon as the handle 26 is returned to its normal position the spring 15 returns the shade to its original position without any further attention on the part of the operator.

The operation of the shade may obviously be accomplished either manually in the manner indicated, or by the foot of the operator, in which case the cord 21 may be continued down to the floor boards of the front compartment and there passed over a pulley 30 and connected to one end of a pivoted pedal 31. Pressure of the operator's foot against the free end of the pedal 31 in the direction of the arrow A will pull down the cord in the same manner as before when the cord may be locked by means of the cam as already described.

I am aware that there are shades for motor vehicles which are designed to be adjusted to various elevations, but the present shade differs from those with which I am familiar, by being set in one predetermined normal position where it is usually maintained and is also capable of being quickly and conveniently moved to any other desired position and there secured as long as may be necessary, after which the shade is automatically returned to the original position.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In combination with a vehicle windshield, of a sunshade, brackets attached to the top of said windshield and pivotally mounting said sunshade, a spring engaging said sunshade adapted to normally keep the sunshade raised out of operative position, flexible controlling means connected to the sunshade and extending within the driving compartment of a vehicle, and a spring pressed member within said compartment adapted to normally engage said controlling means and retain the sunshade at any desired angle, and means for releasing said spring pressed member to restore the shade to inoperative position and a pivoted pedal for actuating said controlling means.

Signed by me, this 4th day of October, 1921.

WILLARD J. BELL.